United States Patent [19]
Silberman et al.

[11] Patent Number: 5,803,324
[45] Date of Patent: Sep. 8, 1998

[54] LIGHTWEIGHT STOWABLE TIRE CARRIER FOR AUTOMOTIVE VEHICLE AND METHOD OF USE

[76] Inventors: Scott A. Silberman, 1838 Doral Ct., Bloomfield Hills, Mich. 48302; John E. Male, 5122 Lake Bluff Rd., West Bloomfield, Mich. 48323; John W. Helms, 106 Chipstone Ct., Peachtree, Ga. 30269

[21] Appl. No.: 852,523

[22] Filed: May 7, 1997

[51] Int. Cl.⁶ .................................................. B62D 43/04
[52] U.S. Cl. .................... 224/42.23; 224/572; 224/42.26; 224/538; 414/463; 294/74; 294/82.14
[58] Field of Search ............................. 224/42.12, 42.23, 224/42.24, 42.26–42.29, 42.38, 42.39, 538, 567, 568, 572, 255; 24/68 CD, 69 CT, 298, 301, 302; 414/462, 463, 466; 410/10, 11, 12, 20–23, 50, 100; 294/74, 82.1, 82.11, 82.14, 149, 150

[56] References Cited

U.S. PATENT DOCUMENTS

| | | |
|---|---|---|
| 1,934,165 | 11/1933 | Butterworth ............................... 410/21 |
| 2,663,474 | 12/1953 | Kelly ........................................ 224/533 |
| 3,352,590 | 11/1967 | Barthule .................................... 294/74 |
| 3,556,325 | 1/1971 | Leahy et al. ............................. 414/463 |
| 3,650,424 | 3/1972 | Dumas . | 
| 3,782,568 | 1/1974 | Alexander . |
| 3,831,793 | 8/1974 | Eller . |
| 3,869,075 | 3/1975 | Kissner . |
| 3,923,221 | 12/1975 | Ballinger ................................. 224/534 |
| 4,117,963 | 10/1978 | Luczynski .............................. 248/499 |
| 4,288,188 | 9/1981 | Smith ...................................... 248/499 |
| 4,416,402 | 11/1983 | Matthew . |
| 4,525,007 | 6/1985 | Chapalain ................................. 294/74 |
| 4,611,961 | 9/1986 | Van Iperen et al. ...................... 410/21 |
| 5,193,955 | 3/1993 | Chou ................................... 24/68 CD |

FOREIGN PATENT DOCUMENTS

| | | | |
|---|---|---|---|
| 88019215 B | 1/1989 | Australia ............................ 224/42.26 |
| 596839 A2 | 5/1994 | European Pat. Off. ............... 224/255 |

Primary Examiner—Allan N. Shoap
Assistant Examiner—Gregory M. Vidovich
Attorney, Agent, or Firm—Young & Basile, P.C.

[57] ABSTRACT

A lightweight stowable carrier for a tire of an automotive vehicle such as a truck or trailer comprises a plurality of straps, preferably formed of woven webbing. In a first embodiment, one set of straps has ratchet buckles for securing the tire to the carrier in encircling relationship. Another set of load-bearing straps is provided with cam buckles for length adjustment and hooks for securement to the underbody of a vehicle. All of the straps cross one another and are stitched at a common centerpoint. In a second embodiment, three separate straps are attached to the tire at points spaced around its circumference. Hooks attached to first ends of the straps are passed around the tire and through coupling links attached to opposite ends to form choker loops around the tire. Two of the straps are of fixed length and the third strap is adjustable in length.

7 Claims, 4 Drawing Sheets

LIGHTWEIGHT STOWABLE TIRE CARRIER FOR AUTOMOTIVE VEHICLE AND METHOD OF USE

FIELD OF THE INVENTION

This invention relates to a carrier for spare or damaged tires and wheels for automotive vehicles, and more particularly to a lightweight stowable tire/wheel carrier for trucks and trailers.

BACKGROUND OF THE INVENTION

It is known to provide an underslung carrier for the spare tire of an automotive vehicle. For example, several automotive vehicles are equipped with rigid, underslung containers having a front pivot and a rear latch for drop-down access to a spare tire. Larger vehicles such as multiple-wheel truck and trailer combinations generally carry no spares as such, but often provide a rigid steel basket under the trailer frame to receive a flat or damaged tire or tire/wheel combination.

Carriers such as the type described above add cost and weight to the vehicle. Particularly in the case of cargo trailers and trucks, it is important to minimize fixed weight, thereby to maximize payload capabilities while staying within legal limits for overall weight. A steel tire basket weighs approximately 35 or 40 pounds and is a good candidate for elimination.

BRIEF SUMMARY OF THE INVENTION

A primary objective of the invention is to provide a lightweight, stowable alternative to the fixed metal basket and/or other heavy and expensive apparatus for carrying spare or damaged vehicle tires and/or wheels in a suspended fashion; i.e., beneath the frame of the vehicle or trailer, or on the rear of the truck cab.

It is another object of the invention to provide a lightweight, stowable, suspended tire/wheel carrier which eliminates the need for the operator to lift a heavy tire or tire/wheel combination to either put it into or take it from the storage apparatus.

In general, these and other objectives are accomplished by means of a tire carrier consisting of several lengths of lightweight, flexible, high-strength material, such as woven webbing, capable of encircling and securing the tire, and means for conveniently attaching the material with the tire therein to the body or frame of a vehicle.

In one preferred embodiment disclosed herein, the carrier comprises two sets of identifiably different webbing straps arranged in a radial pattern and fastened together at the crossing point. One set of webbing straps, the "securing" straps, are provided with ratchet buckles or the like so that opposed ends of the straps can be brought and secured together around the tire to firmly bind it to the carrier. The remaining straps, i.e., the "support" straps, are provided with means such as hooks which permit them to be secured to appropriate attachment points on the underside or other portion of the vehicle and are further provided with cam buckles or the like which permits these straps to be adjusted in length. Accordingly, when using the carrier to suspend the tire below the vehicle, it is possible to place the tire on the ground directly under the attachment points of the vehicle and thereafter incrementally shorten the support straps by simple mechanical action to raise the tire up against the vehicle underbody to lock it in place.

In a second preferred embodiment disclosed herein, the carrier comprises a plurality of separate straps, each of which is secured to the tire at one end and to an attachment point on the vehicle frame or body at an opposite end. Three straps are preferably used, and are secured to the tire at substantially evenly spaced locations around the circumference of the tire. Two of the straps are of a fixed, non-adjustable length, and the third is provided with a cam buckle so that it is variable in length. Each of the three straps has a loop-like end link attached to its first end and a hook attached to its opposite end. The straps are looped around the tire at the circumferentially spaced locations, and the hook on each strap is then passed through its respective end link to form a choker loop encircling the tire. The hooks are attached to the attachment points on the vehicle frame and the adjustable length strap is shortened until the tire is lifted well clear of the ground and suspended in a generally horizontal position against or close to the underside of the frame.

According to another aspect, the present invention provides a simple and easy to use method of storing and transporting a vehicle tire or tire/wheel combination in a suspended fashion by, first, securing the tire within a carrier of webbing and, second, thereafter, attaching the tire and surrounding webbing to attachment point on the underside or other portion of a vehicle.

DETAILED DESCRIPTION OF THE ILLUSTRATIVE EMBODIMENT

Figure 1:
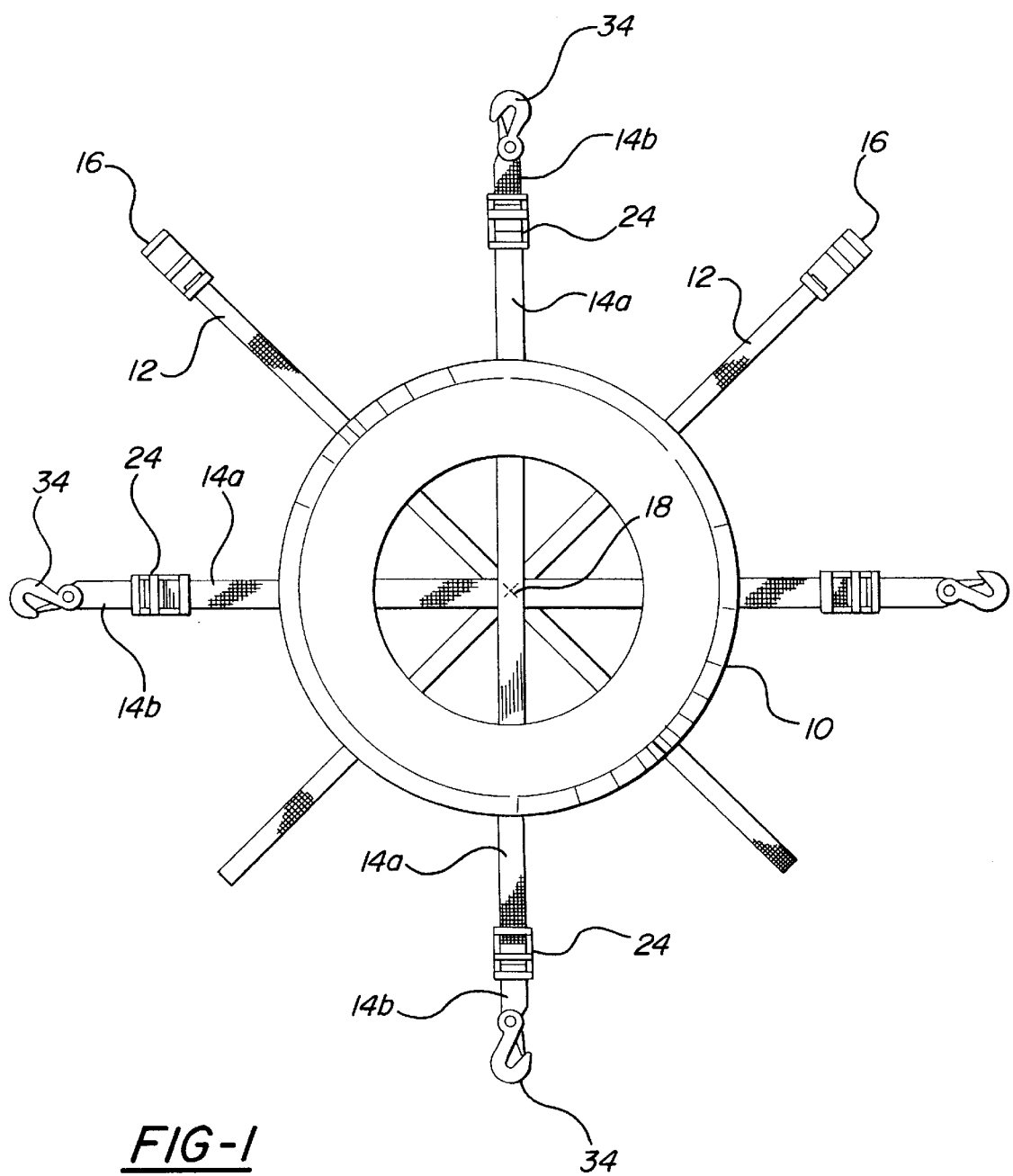
FIG. 1 is a plan view of a first embodiment of the subject carrier underlying a tire and with all lengths of webbing straps in the extended, unattached condition.

Referring to FIG. 1, the plan view shows a 44 inch diameter truck tire 10 overlying a stowable lightweight carrier according to a first embodiment of the present invention. The carrier comprises a first pair of orthogonally arranged flexible securing straps 12, preferably taking the form of a webbing woven from Nylon or other organic strands, and a second pair of orthogonally arranged flexible support straps 14 of a similar material. All four of the straps cross at a common point 18, shown in FIG. 1 at the center of the tire 10, and all four straps are stitched securely together at this common point.

Securing straps 12 are preferably formed from a one-inch wide webbing, and each strap terminates at one end with a ratchet buckle 16. The ends of securing straps 12 opposite from ratchet buckles 16 are suitably finished for durability and to prevent unravelling of the woven material, but have no hardware attached thereto.

Each support strap 14 comprises three separate lengths of two-inch wide webbing material: one long center segment 14a and two short end segments 14b. Each end segment 14b has a cam buckle 24 attached to a first end thereof and a snap hook 34 attached to an opposite end. The ends of center segment 14a are finished for durability and are threaded through the cam buckles 24 of their respective end segments 14b so that the overall length of support straps 14 may be adjusted by drawing either or both ends of the center segment through their respective cam buckles.

The overall lengths of each of straps 12 and 14 is on the order of 100 inches. Securing straps 12 are disclosed as being smaller in width or thickness than support straps 14 because the securing straps need not have as great a tensile strength as the support straps. The difference in widths of the two types of straps also permits them to be readily distinguishable from one another, both visually and tactilly. It may also be desirable to further increase the ease with which the support straps may be visually distinguished from the securing straps. This may be accomplished by forming the webbing of securing straps 12 in a first color and the webbing of support straps 14 in a second, different color.

The terms "webbing" and "straps" are used interchangeably in this specification and refer to any durable, high tensile strength, flexible material which can be fashioned into strap-like lengths and sewn or riveted to itself or to a similar material. As will be apparent to a person of skill in this art, straps 12 and 14 could be replaced by any high-strength, elongated, flexible member, such as chain, synthetic rope or wire rope.

Although the term "tire" is used herein and the drawings depict a tire alone, unmounted on a wheel, this is not meant to limit the scope of the invention: the invention carrier may just as effectively be used to carry a tire/wheel combination or a wheel with no tire mounted thereto.

Figure 2:
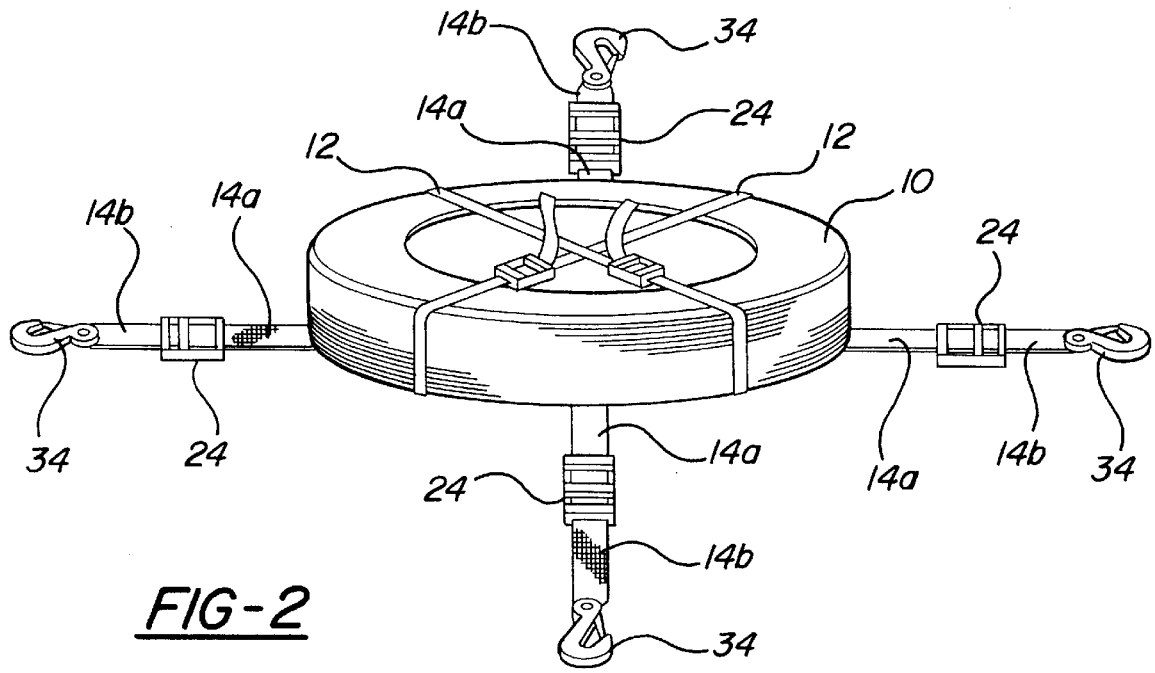
FIG. 2 is a perspective view of the carrier of FIG. 1 with the securing straps connected to one another and the support straps underlying the tire and extending radially therefrom.

The function of the ratchet buckles 16 is to permit opposite ends of the one-inch webbing to be wrapped around the tire in encircling relationship and securely fastened together in the manner shown in FIG. 2. The ratchet buckles are commercially available devices suitable for this purpose but are merely illustrative in nature.

Figure 4:
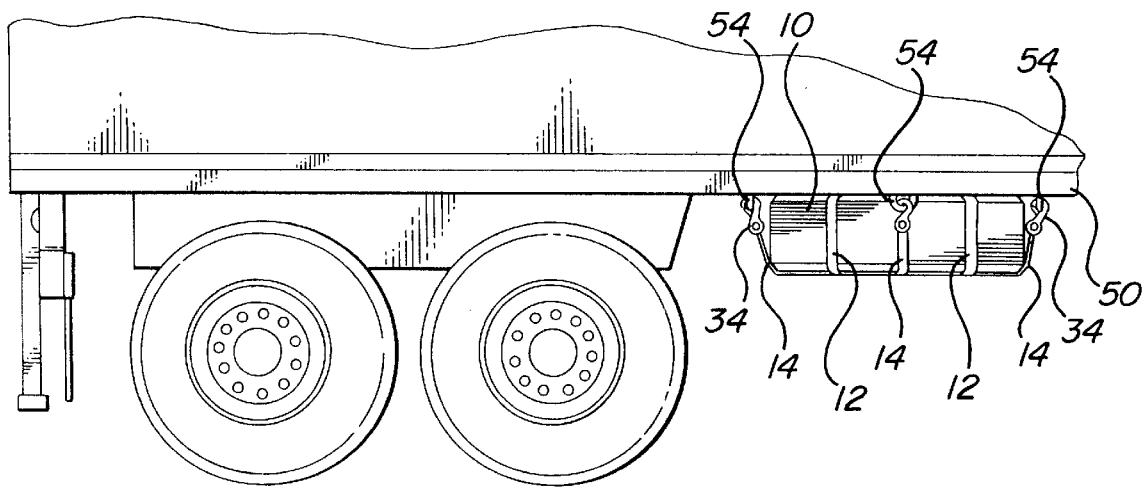
FIG. 4 is a perspective view of the carrier of FIG. 1 in the secured position under the frame and body of a trailer.

The function of the cam buckles 24 is to provide for easy, manual length adjustment for purposes of incrementally raising the tire 10 to a stowed position as shown in FIG. 4 and dropping it down from the stowed position as hereinafter described. Again, the cam buckles are commercially available devices suitable for the purposes described herein but are merely illustrative in nature.

The purpose of hooks 34 is to permit the carrier and the tire 10 to be secured in a suspended relationship to the trailer frame 50 or other portion of the truck/trailer combination for temporary storage and transportation purposes. Hooks 34 are preferably of the snap hook type, having a spring-loaded gate element to ensure that the hook does not inadvertently become disengaged from its attachment point. Hooks 34 should be of such size as to be easily manipulated by the human hand.

Figure 5:
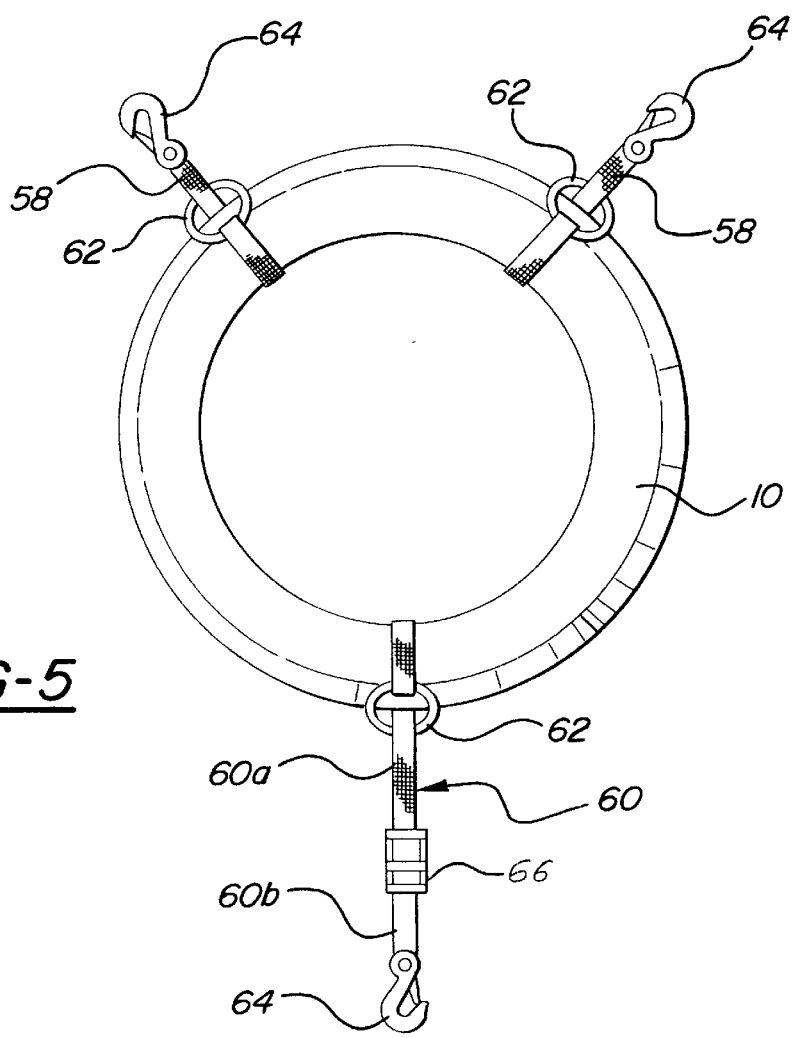
FIG. 5 is a plan view of a second embodiment of the subject carrier with all three of the webbing straps secured to a tire prior to being attached to a vehicle.

Referring to FIG. 5, the plan view shows a second embodiment of the invention truck carrier attached to a 44" diameter truck tire 10. The carrier comprises a pair of fixed length straps 58 and a third, adjustable length strap 60. Straps 58 and 60 are preferably, as in the first described embodiment, formed of a webbing woven from nylon or other organic strands. All three of straps 58, 60 terminate at one end with a loop-like metal coupling link 62 and at the opposite end with a snap hook 64.

Adjustable length strap 60 comprises two separate lengths of webbing material: one long segment 60a having the coupling link 62 attached thereto, and one short segment 60b having the snap hook 64 attached to a first end thereof and a cam buckle 66 attached to the opposite end. Strap segments 60a, 60b are connected by threading the free end of long segment 60a through cam buckle 66, the overall length of strap 60 being adjustable thereby.

The overall lengths of fixed length straps 58 is on the order of 42", and the overall length of adjustable length strap 60 at full extension is on the order of 90". All segments of straps 58,60 are preferably formed of 2" wide webbing.

Operation

In operation, it is assumed that the tire 10, with or without a wheel, has been removed from a vehicle and is to be stored in an underslung relationship to the vehicle for temporary transportation to a truck depot or service station.

Figure 3:
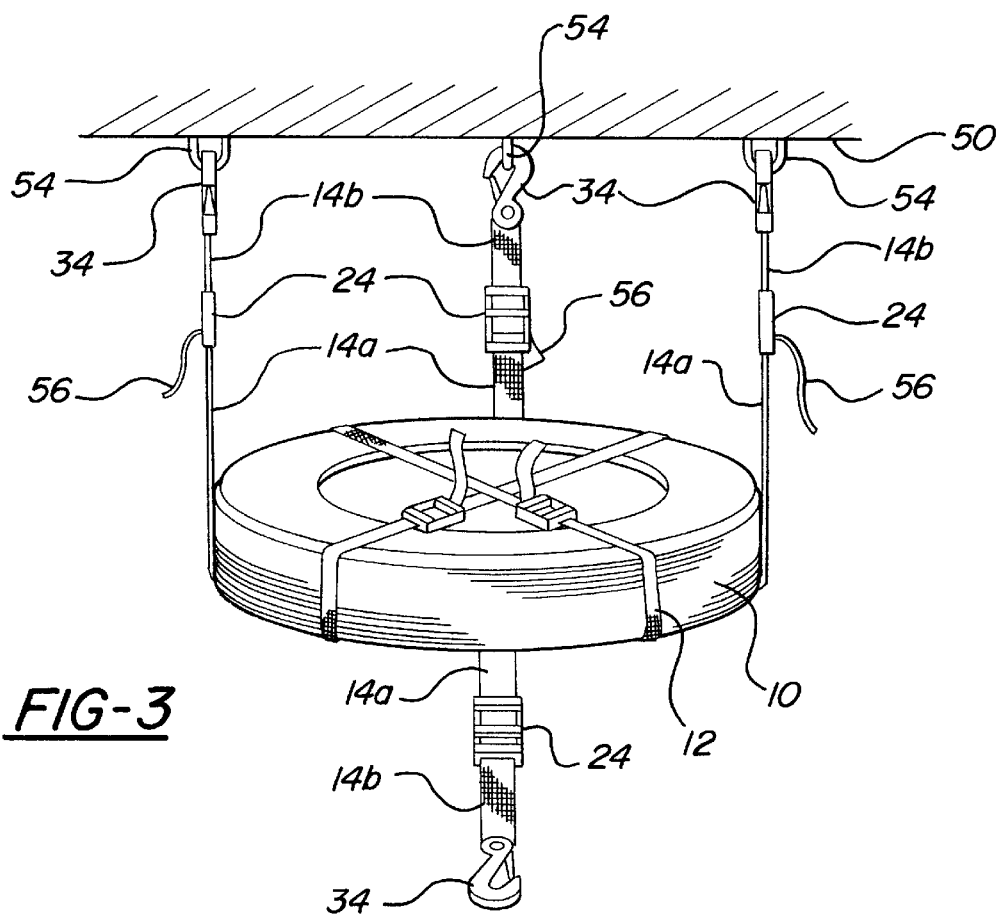
FIG. 3 is a perspective view of the carrier of FIG. 1 with three of the four adjustable lengths of webbing attached to the vehicle.

In employing the first embodiment of the subject invention, as shown in FIGS. 1–3, the first step is to unpackage the carrier webbing as necessary and lay it out on an open, preferably uncluttered and fairly flat ground. Straps 12, 14 are extended in the radial pattern shown in FIG. 1, and the tire 10 is placed over the carrier webbing straps with the centerpoint 18 approximately at the center of the tire.

The second step involves bringing the opposite lengths of the securing straps 12 around the tire 10 in encircling relationship and securing those lengths together by means of the ratchet buckles 16. The resulting arrangement should be as shown in FIG. 2. Ratchet buckles 16 make it relatively easy for a person of ordinary dexterity and strength to produce adequate tension in the securing straps 12 to hold the tire 10 securely in place.

The next step is to place the carrier and tire under the vehicle, immediately beneath attachment points 54. Attachment points 54 are defined by four steel loops, eyes or the equivalent on the underside of frame 50, and are arranged in a square pattern approximately 42–48 inches on a side. Support straps 14 are adjusted to full length using cam buckles 24 at either end, and hooks 34 are snapped into engagement with attachment points 54 as shown in FIG. 3.

The next step is to pull on the free ends 56 of support straps 14 which extend from cam buckles 24 to incrementally raise the tire 10 into snug, abutting relationship to the trailer frame 50, as shown in FIG. 4. The cam buckles operate in the manner of a single action pulley and serve as one-way latches for this purpose. Free ends 56 are then suitably stowed under or within the center of the tire, and the tire and carrier are ready for temporary transportation to a truck depot or service station.

At the depot or service station, tire 10 may be retrieved from the vehicle by pressing the tension release button on each of the four cam buckles 24, preferably one or two at a time, thus dropping the tire down onto the ground immediately below the trailer frame. Hooks 34 can then be released from the attachment points 54 and the securing straps 12 undone to release the tire. The webbing carrier may then be rolled up and stashed in a convenient bag or container within the cab of the truck or in some other convenient location. The carrier is, therefore, easily stowed, light in weight and easily operated to both stow and release a tire or tire/wheel combination as needed.

Figure 6:
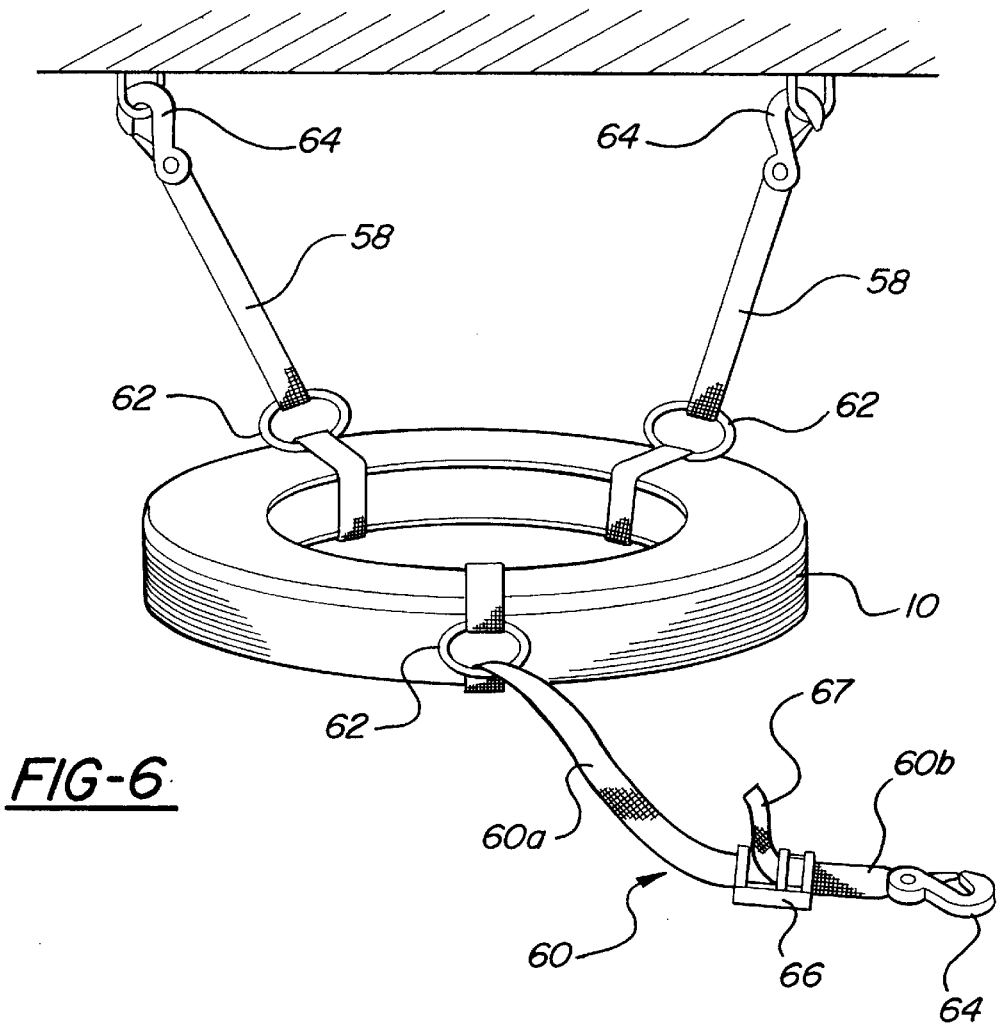
FIG. 6 is a perspective view of the carrier of FIG. 5 with two fixed length straps attached beneath the vehicle.

In employing the second embodiment of the subject invention, as shown in FIGS. 5 and 6, the first step is to unpackage the carrier straps 58,60 and lay them flat on the ground with the end links 62 adjacent one another and the straps extending radially outward. Tire 10 is placed over the carrier straps such that end links 62 are in the center of the tire.

The second step involves bringing end links 62 of fixed length straps 58 upward through the center of tire 10 and passing each hook 64 through its respective end link to form "choker" loops around the tire. Hooks 64 of fixed length straps 58 are then hooked onto attachment points 54 on the underside of vehicle frame 50. At this point, tire 10 should be hanging from attachment points 54 in a generally upright position by the two fixed length straps 58.

The next step is to form a choker loop around tire 10 with adjustable length strap 60, passing hook 64 through end link 62 in a manner the same as described above. Adjustable length strap 60 is attached to tire 10 at the point on the tire's circumference nearest the ground when the tire is hanging upright from fixed length straps 58. The hook 64 of adjustable length strap 60 is then hooked onto a third attachment point on the underside of trailer frame 50 and free end 67 of long segment 60a is pulled through cam buckle 66 to shorten adjustable length strap 60 until tire 10 is raised to a horizontal position, snugly retained against the underside of trailer frame 50 as shown in FIG. 4.

At the truck depot or service station, tire 10 is retrieved from the vehicle by pressing the tension release button on cam buckle 66 to drop the tire onto the ground immediately below the truck frame. Hooks 64 are then released from the attachment points 54 and passed through their respective end links 62 to disengage straps 58,60 from the tire. The straps may then be rolled up and placed within a bag or other container to be carried within the cab of truck or in some other convenient location.

Figure 7:
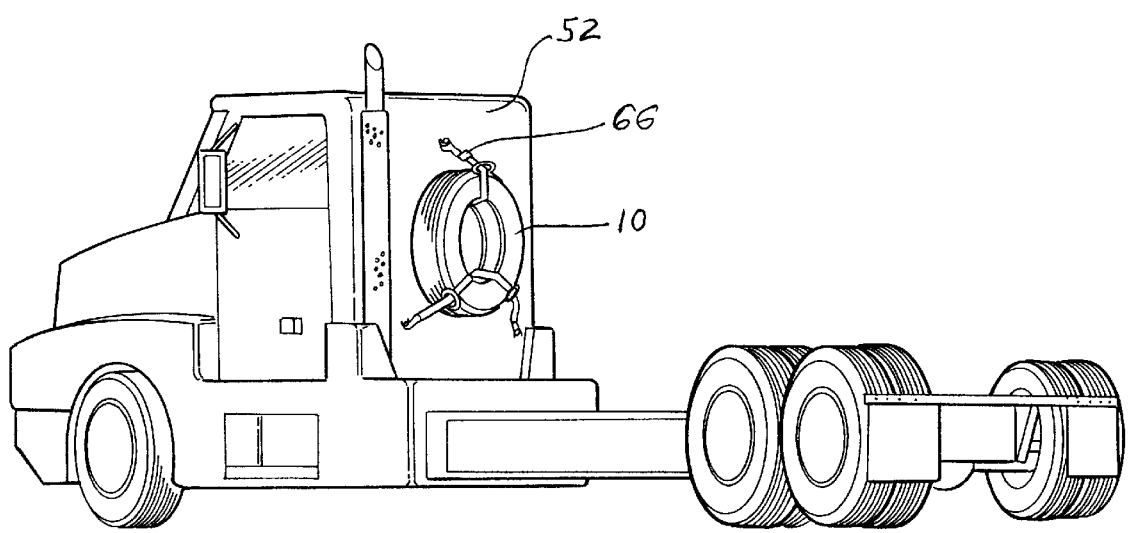
FIG. 7 is a perspective view of the carrier of FIG. 5 in the secured position on the rear surface of a truck cab.

The present invention may be used to attach a tire at a vehicle at locations other than beneath the vehicle frame. A possible alternative location in shown in FIG. 7, where the second embodiment of the invention is used to suspend tire 10 in a vertical position on the rear surface of truck cab 52. The invention is usable at any location provided with attachment points with which the straps may be engaged.

The sizes of the straps given above are for illustrative purposes only. The one inch webbing has a load bearing capability of 5000 pounds while the two inch webbing has a 10,000 pound capacity. These are more than adequate for normal truck tires.

Whereas a preferred embodiment of the invention has been illustrated and described in detail, it will be apparent that various changes may be made in the disclosed embodiment without departing from the scope or spirit of the invention.

The invention claimed is:

1. An improvement for carrying a tire on an automotive vehicle, the improvement comprising a lightweight, stowable carrier for removably attaching the tire to the automotive vehicle having a plurality of attachment points on a surface of said vehicle, the carrier comprising:

three separate elongate, flexible members each having a first end and a second end, said members being of sufficient length to extend substantially radially outward from said tire to respective said attachment points when said tire is not in contact with said surface;

means on said flexible members for securing said first ends of said flexible members to said tire at respective points spaced around a circumference of said tire;

means on said flexible members for coupling said second ends of said flexible members to respective said attachment points; and means for reducing the effective length of one of said flexible members such that, when said first ends are secured to said tire and said second ends are coupled to said attachment points, all of said flexible members are made taut and said tire is held against said surface.

2. A carrier as defined in claim 1 wherein said securing means comprises end links secured to said first ends for passage therethrough of respective second ends of said members to form choker loops passing around said tire.

3. A carrier as defined in claim 1 wherein said flexible members are formed of a woven webbing material.

4. A carrier as defined in claim 1 wherein said coupling means are hooks.

5. A method for removably attaching a tire to an automotive vehicle having a plurality of attachment points disposed on a surface of said vehicle, the method comprising the steps of:

securing respective first ends of first and second elongate, flexible members to said tire at points spaced around a circumference of said tire;

coupling respective second ends of said first and second flexible members to a first point and a second point of said attachment points;

securing a first end of a third elongate, flexible member, which includes means for adjusting the effective length thereof, to said tire at a point around the circumference of said tire spaced from said first and second flexible members;

securing a second end of the third member to a third of said attachment points such that said members respectively extend radially outward from said tire to said attachment points and said tire is not in contact with said surface of said automotive vehicle; and actuating said length adjusting means to shorten said flexible member such that the first, second and third flexible members are tightened to a substantially taut condition and said tire is held against said surface of said automotive vehicle.

6. The method of claim 5 wherein the steps of securing said first ends of said flexible members to said tire comprises:

passing said flexible members through a center of said tire; and passing respective second ends of said flexible members through end links secured to respective first ends of said flexible members to form choker loops surrounding said tire.

7. The method of claim 5 wherein the step of coupling said second ends of said flexible members to said attachment points comprises:

engaging hooks attached to said second ends of said flexible members with said attachment points.

* * * * *

UNITED STATES PATENT AND TRADEMARK OFFICE
CERTIFICATE OF CORRECTION

PATENT NO. : 5,803,324
DATED : September 8, 1998
INVENTOR(S) : Scott A. Silberman It is certified that error appears in the above-identified patent and that said Letters Patent is hereby corrected as shown below:

Col. 6, Line 55, delete "step" and insert --steps--.

Signed and Sealed this

Sixteenth Day of March, 1999

Attest:

Q. TODD DICKINSON

*Attesting Officer*  *Acting Commissioner of Patents and Trademarks*